US005459777A

United States Patent [19]
Bassa et al.

[11] Patent Number: 5,459,777
[45] Date of Patent: Oct. 17, 1995

[54] TELECOMMUNICATIONS NETWORK TRAFFIC MANAGEMENT SYSTEM

[75] Inventors: Paul A. Bassa; Joseph J. Isaac, both of London, England

[73] Assignee: British Telecommunications public limited company, London, England

[21] Appl. No.: 200,326

[22] Filed: Feb. 23, 1994

[30] Foreign Application Priority Data

Oct. 28, 1993 [EP] European Pat. Off. .............. 93308580

[51] Int. Cl.$^6$ ........................... H04M 1/24; H04M 3/22; H04M 15/00; H04J 1/16
[52] U.S. Cl. .................... 379/133; 379/9; 379/10; 379/14; 379/32; 379/33; 379/134; 379/136; 370/13; 370/16
[58] Field of Search ................................ 379/9, 10, 14, 379/32, 33, 133, 134, 136; 370/13, 16

[56] References Cited

U.S. PATENT DOCUMENTS

| | | | |
|---|---|---|---|
| 5,042,027 | 8/1991 | Takase | 379/136 |
| 5,049,873 | 9/1991 | Robins | 379/32 |
| 5,058,105 | 10/1991 | Mansour | 370/16 |
| 5,212,475 | 5/1993 | Thoma | 370/13 |
| 5,271,000 | 12/1993 | Engbersen | 370/13 |
| 5,278,823 | 1/1994 | Mandel | 370/13 |
| 5,278,977 | 1/1994 | Spencer | 370/16 |
| 5,309,448 | 5/1994 | Bouloutas | 370/13 |
| 5,311,585 | 5/1994 | Armstrong | 379/134 |

OTHER PUBLICATIONS

Bassa et al, "Object–Oriented Network Modelling within an Architecture for International Network Traffic Management", Proceedings of the Fourth TMN Conference, Dublin, 14–16, Nov. 1990, Unicon Seminars Ltd., pp. 186–197.
"Knowledge–Based Application for Network Management"—BT.
Stinson et al, "A State–Based Approach to Real–Time Telecommunications Network Management", IEEE Network Operations and Management Symposium, Session 18, Paper 1, vol. 2, 6 Apr. 1992, Memphis, pp. 520–532.
Weihmayer et al, "A Distributed AI Architecture for Customer Network Control", IEEE Global Telecommunications Conference & Exhibition, Session 408, Paper 6, vol. 1, 2 Dec. 1990, San Diego, pp. 656–662.
Wolf, "Advanced Techniques for Managing Telecommunications Network", IEEE Communications Magazine, vol. 28, No. 10, Oct. 1990, New York, pp. 76–81.
Stach, "Graph Analysis and Rule Based Paradigms for the Identification, Containment and Clearing of Switch Congestion in Non–Hierarchical Circuit Switched Networks", Proceedings of the National Communications Forum, vol. 43, No. 1, Oct. 1989, Chicago, pp. 474–482.
Westcott et al, "Automated Network Management", IEEE Infocom 85 Proceedings, 26 Mar. 1985, Washington, pp. 43–51.
Goodman et al, "Network Operators Advice and Assistance (NOAA): A Real–Time Traffic Rerouting Expert System", IEEE Global Telecommunications Conference, vol. 2, 6 Dec. 1992, Orlando, pp. 1240–1244.

Primary Examiner—Stephen Chin
Assistant Examiner—Vijay Shankar
Attorney, Agent, or Firm—Nixon & Vanderhye

[57] ABSTRACT

An international telecommunications network includes a set of international exchanges located in a particular country which connect a national telecommunications network situated in that country with networks situated in other countries. The international network includes a traffic management system having an expert system with a set of knowledge sources. An identifier identifies alarms relating to traffic and a prioritizer arranges the alarms in order of priority. A diagnoser diagnoses the cause or causes of the alarms by proposing suspected causes and investigating them in relation to traffic and network data. A resolver proposes remedies for the causes of the alarms by reasoning over each cause in relation to data on traffic associated with the cause, reasoning over each remedy in relation to data on traffic in the neighborhood of the remedy to determine a figure of merit for the remedy, and then arranging the remedies in order of merit. Remedies may be implemented automatically or under the control of an operator.

6 Claims, 4 Drawing Sheets

TELECOMMUNICATIONS NETWORK TRAFFIC MANAGEMENT SYSTEM

CROSS-REFERENCE TO RELATED APPLICATION

This application is related to our copending commonly assigned application Ser. No. 08/200,408 filed Feb. 23, 1994.

BACKGROUND OF THE INVENTION

1. Field of the Invention

This invention relates to a telecommunications network comprising a plurality of exchanges, a set of routes for carrying telecommunications traffic between said exchanges, and a traffic management system.

2. Related Art

An international telecommunications network for a particular country may comprise a set of international exchanges connected both to a national network of trunk exchanges and to international exchanges located in other countries. An international telecommunications network may be provided with a traffic management center where network management personnel receive data on traffic passing between the network and networks in other countries. The data includes traffic alarms and the network management personnel respond to these by selecting appropriate remedies with the aim of increasing the volume and proportion of successful traffic. Available remedies include expansive and restrictive controls. Expansive controls spread traffic from congested to less congested areas, whereas restrictive controls are used to limit access to the network by traffic with a low chance of successful completion. The task of selecting appropriate remedies in response to traffic alarms is laborious.

SUMMARY OF THE INVENTION

According to this invention there is provided a telecommunications network comprising a plurality of exchanges, a set of routes for carrying telecommunications traffic between said exchanges, and a traffic management system, said traffic management system comprising means for receiving traffic data from said exchanges, means for identifying alarms from said traffic data, means for proposing at least one suspected cause for said alarms, means for investigating said at least one cause in relation to traffic data, and means for proposing at least one remedy for the or each cause.

BRIEF SUMMARY OF THE DRAWINGS

This invention will now be described in more detail, by way of example, with reference to the accompanying drawings in which.

DETAILED DESCRIPTION OF EXEMPLARY EMBODIMENTS

Figure 1:
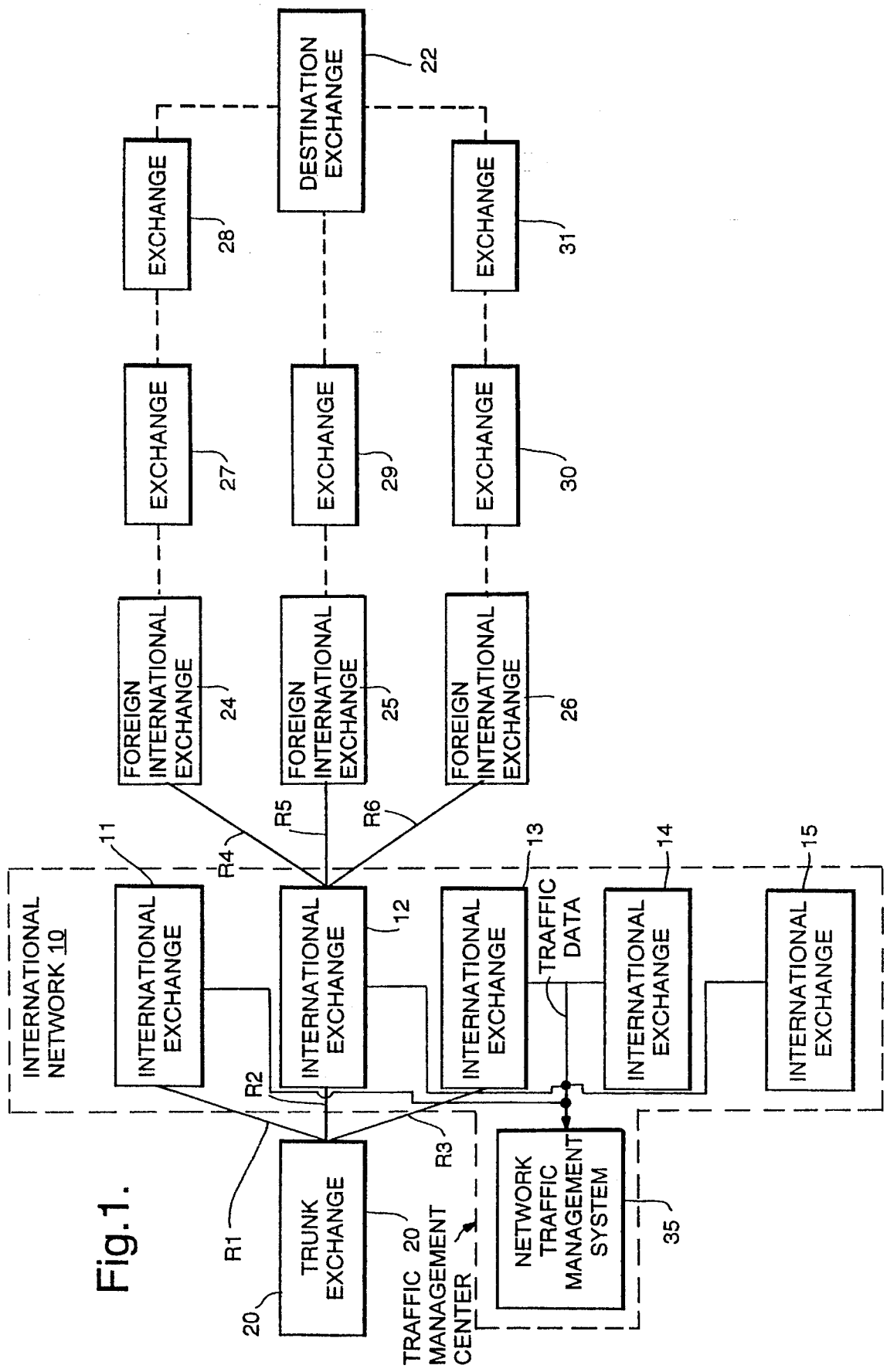
FIG. 1 is a block diagram of an international telecommunications network located in a particular country.

Referring now to FIG. 1, there is shown a block diagram of an international public telecommunications network 10 located in a particular country and its relationship with the national public telecommunications network of that country and telecommunications networks in foreign countries.

The international network 10 comprises five international exchanges 11 to 15. The national network comprises a network of trunk exchanges, each of which is connected to several local exchanges. Each trunk exchange is connected to three of the five international exchanges. For reasons of simplicity, only one trunk exchange, namely trunk exchange 20, is shown in the present example. The trunk exchange 20 is connected to international exchanges 11 to 13, respectively, by traffic routes R1 to R3. The international exchanges 11 to 15 and the trunk exchange 20 are digital exchanges and, by way of example, may be System X exchanges manufactured by GEC Plessey Telecommunications or AXE10 exchanges manufactured by Ericsson Telecommunications.

Each of the international exchanges 11 to 15 is connected to a number of international exchanges located in foreign countries by various routes. From each foreign exchange, traffic may be transmitted to a large number of destination exchanges.

By way of example, FIG. 1 shows how traffic may be transmitted from international exchange 12 to a destination exchange 22. International exchange 12 is connected by three routes R4, R5, R6, respectively, to three foreign international exchanges 24, 25 and 26. From the exchange 24, traffic may be transmitted through exchanges 27 and 28 to destination exchange 22. From exchange 25, traffic may be transmitted through exchange 29 to the destination exchange 22, and from exchange 26 traffic may be transmitted through exchanges 30 and 31 to the destination exchange 22. Other routes may exist between exchanges 24, 25, 26, and the destination exchange 22.

For outgoing calls, each of the international exchanges 11 to 15 is provided with a route table for each of the destination exchanges which may be connected to it. Each route table lists the order in which routes should be tried in attempting to make a connection. For example, for outgoing calls from international exchange 12 to destination exchange 22, the order of routes in the route table is R4, R5, R6. Thus, the international exchange will initially try route R4 when attempting to make a connection to destination exchange 22. If this is unsuccessful, it will try R5 and, if this too is unsuccessful, it will then try R6. International exchange 12 has no control over routes which are followed beyond exchanges 24, 25 and 26 and this is indicated by the dashed lines in FIG. 1. Route tables may be altered by changing the order of the routes, omitting routes or inserting alternative routes.

In the international network 10, traffic is carried along the various routes by a variety of carriers. Suitable carriers are copper cables, fiber optic cables, terrestrial microwave links and satellite links.

Figure 2:
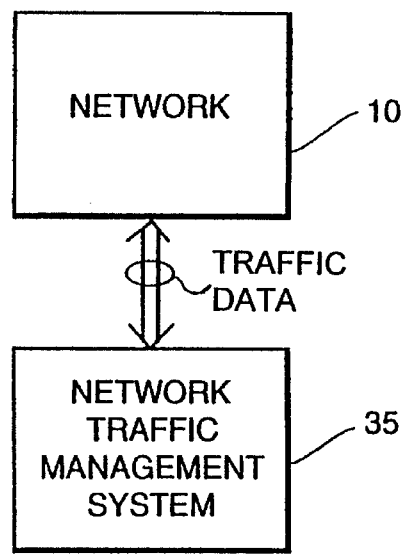
FIG. 2 shows the relationship between the network of FIG. 1 and the associated network traffic management system.

The network 10 includes a network traffic management system 35 located at a traffic management center. Referring to FIG. 2, traffic data is transmitted from the international exchanges 11 to 15 to the network traffic management system 35. As will be explained below, the traffic data is analyzed in the traffic management system 35 and the traffic management system proposes, and optionally may apply, suitable controls to the network 10.

The network traffic management system 36 takes the form of a computer workstation configured as an expert system. The general layout of the expert system is shown in FIG. 3.

Figure 3:
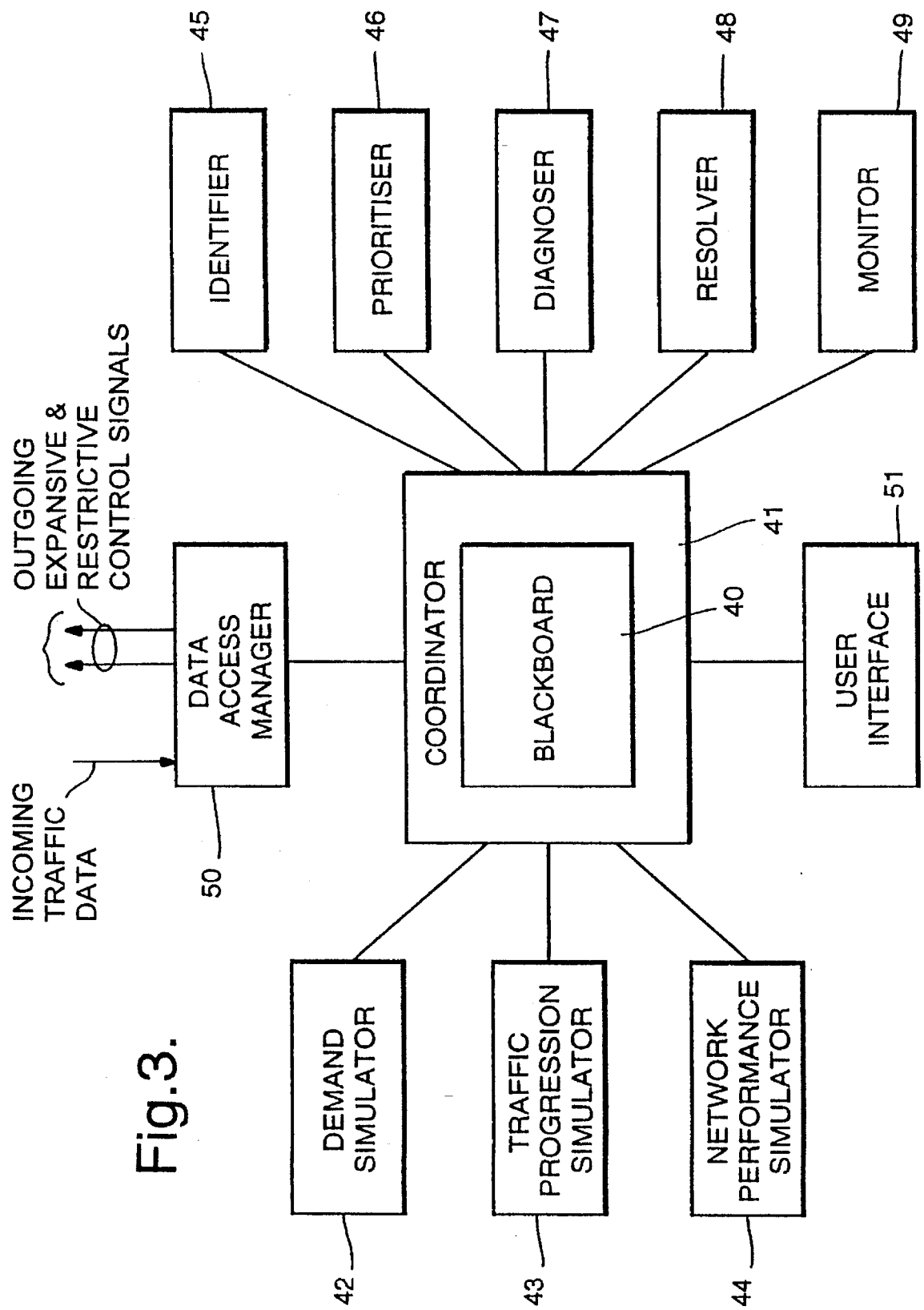
FIG. 3 is a block diagram of an expert system forming part of the traffic management system.

Referring now to FIG. 3, the expert system is based on a blackboard architecture. The expert system comprises a blackboard 40, a coordinator 41, three knowledge sources for simulating traffic in the form of a traffic demand simulator 42, a traffic progression simulator 43, and a network performance simulator 44, five knowledge sources for managing traffic problems in the form of an identifier 45, a prioritiser 46, a diagnoser 47, a resolver 48 and a monitor 49. The expert system also includes a data access manager 50 and a user interface 51. The data access manager 50 and the user interface 51 are also knowledge sources. These components of the expert system will now be described in more detail.

The blackboard 40 locates information centrally, provides the knowledge sources with access to this information, and acquires data from the knowledge sources via the coordinator. When the blackboard 40 requires information from a knowledge source, the coordinator selects the appropriate knowledge source to obtain the required information. The knowledge sources do not communicate with each other directly.

The blackboard 40 is divided into three partitions, namely, a network modeller, a scenario manager and an event causal network. The scenario manager provides storage of scenario definitions, for example the application of a routing control or the failure of an exchange. The event causal network stores the conclusions of reasoning by the knowledge sources.

The network modeller stores the topology of the network and traffic and network data for both actual and hypothetical scenarios. The topology includes routing tables for the individual international exchanges and also details of restrictive and expansive controls that can be applied to each exchange. The traffic and network data include raw traffic statistics expressed as bids, seizures, and answers, traffic and network parameters expressed as answer bid ratio, answer seizure ratio, percentage overflow, bid-seizure ratio, and seizures per circuit per hour, percentage of circuits in service on a particular route, and also status alarms for international exchanges. These parameters are calculated in the network modeller from raw traffic values. The meanings of these terms will now be explained with reference to the exchange 12 shown in FIG. 1.

When the exchange 12 attempts to place a call on a circuit of route R4 in order to connect the call to a target number accessed by the destination exchange 22, the attempt is known as a bid. If the call is successfully placed on R4 between exchanges 12 and 24, that is known as a seizure. If the call is successfully answered by the target number, that is known as an answer. If the exchange 12 is not able to connect the call on route R4, it will then try routes R5 and R6. If the attempts on all three routes are unsuccessful, the call will fail. Percentage overflow is the ratio of failed attempts to connect calls to destination numbers accessed by destination exchange 22 to the total number of attempts expressed as a percentage. The remaining parameters are self-explanatory.

The data access manager 50 is responsible for accessing and storing traffic data and traffic profiles from the international exchanges 11 to 15 and for transmitting signals to them to implement expansive and restrictive controls.

The traffic demand simulator 42 obtains standard traffic profiles form the blackboard 40 prepared from historical traffic data. From profile specifies traffic demand data, under normal circumstances, for calls from one location to another, for example from a foreign exchange to an exchange in the country in which the network 10 is located. The traffic demand is specified by volume of traffic and average call duration. Under normal circumstances, actual traffic demand for calls from the location to another will match the profile prepared from historical data. The demand simulator 42 has the ability to modify the standard profiles to take account of a variety of factors including seasonal variations, peak day events, actions taken by foreign administrations, network faults and abnormalities, and unpredictable events such as disasters.

The traffic progression simulator 43 uses data provided by the demand simulator 42 via the blackboard 40 to determine simulated values for bids and seizures on the routes of the network 10 for any given time of day and any given scenario, for example a peak day event or a network fault.

The network performance simulator 44 obtains historical profiles from the blackboard 40 for answer seizure ratios for calls placed on the routes of network 10 for destinations outside the network 10 under normal circumstances. The network performance simulator 44 can modify the standard profiles to provide simulated values for answer seizure ratios for any given time of day and any given scenario. Thus, the network performance simulator 44 can modify the standard profiles to take account of various factors such as seasonal variations, peak day events and network faults. The network performance simulator 44 can also modify the standard profiles as the result of comparison between simulated results and real data obtained subsequently.

The identifier 45 obtains values for traffic and network parameters expressed as answer seizure ratio, answer bid ratio, seizures per circuit per hour, percentage overflow and percentage of circuits in service together with values for the thresholds for these parameters from the blackboard 40. It compares the traffic values with the thresholds and generates an alarm where the value of a parameter is on the alarm side of the threshold for that parameter. The alarms are then returned to the blackboard 40 where they are stored as part of the event causal network.

The prioritiser 46 arranges the alarms present on the blackboard 40 in order of priority. More specifically, it arranges the alarms in order of priority on the basis of extent of threshold violation, usage and capacity of the traffic routes, and the number of alarms on a particular route or to a particular destination.

Figure 4:
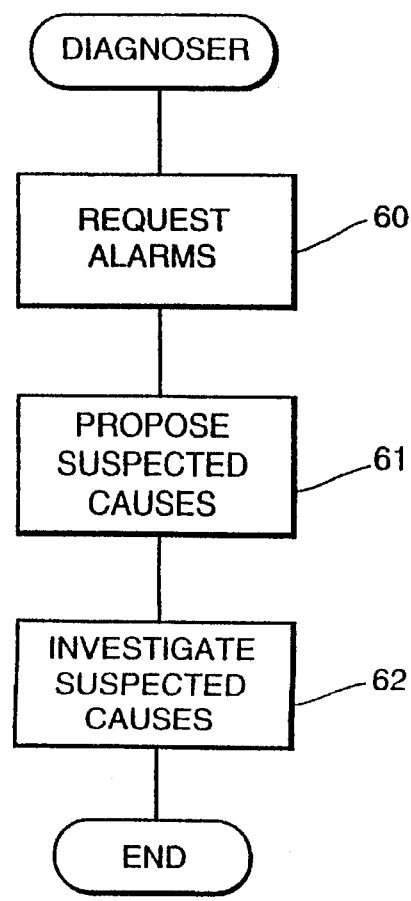
FIGS. 4 and 5 are flow charts illustrating part of the operation of the expert system.

A flow chart for the diagnoser 47 is shown in FIG. 4. In a step 60, the diagnoser requests current alarms and also current traffic and network data from the blackboard 40. Next, in a step 61, the diagnoser uses cause selection rules to propose at least one suspected cause for the alarms. Quite often, a single suspected cause will be found for several alarms. Sometimes a suspected cause is not found for an alarm. Then, in a step 62, the diagnoser 47 uses investigation rules to investigate the suspected causes in relation to the current traffic and network data. The causes are returned to the blackboard 40.

The cause selection and investigation rules used in steps 61 and 62 will depend partly upon the exact details of the network 10 and the national and foreign networks to which it is connected. An exemplary set of rules is set out below.

In the step 61, if there is a status alarm on one of the international exchange 11 to 15, exchange failure is given as the suspected cause.

If there is a percentage circuits in service alarm on a particular route from one of the international exchanges 11 to 15, transmission failure on the route is given as the suspected cause.

If there is both an answer seizure ratio alarm from one of the international exchanges on a particular route to a foreign destination exchange and also a percentage overflow alarm from the international exchange to the foreign exchange, mass calling to a number served by the destination exchange is given as the suspected cause.

If there is a percentage overflow alarm from one of the international exchange to a foreign destination exchange but no corresponding answer seizure ratio alarm, traffic congestion on routes between the international exchange and the destination exchange is given as the suspected cause.

If there is an answer seizure ratio alarm on a route from one of the international exchanges to a foreign destination exchange but no corresponding percentage overflow alarm, a problem at the destination exchange is given as the suspected cause.

If there is a seizures per circuit per hour alarm on a route from one of the international exchanges, a route quality problem is given as the suspected cause.

Finally, if there is an answer bid ratio alarm on a route from one of the international exchanges to a foreign destination exchange but no corresponding percentage overflow alarm, a problem at the destination exchange is given as the suspected cause.

In step 62, it is not normally appropriate to make investigations in the cases of exchange failure, transmission failure, or local problem.

If the suspected cause is mass calling, an investigation is made to determine whether the mass calling to the destination exchange is proposed as a suspected cause for just one or more than one of the international exchanges.

If the suspected cause is traffic congestion between an international exchange and a foreign destination exchange, an investigation is made to determine whether there is a percentage circuits in service alarm on any of the routes listed in the route table for calls form the international exchange to the destination exchange. If there is a percentage circuits in service alarm on a particular route, the cause is changed to transmission failure on that route.

Where the suspected cause is a destination problem, an investigation may be made to determine if the problem is before or after an intermediate exchange.

Where the suspected cause is a route quality problem, an investigation is made to determine whether there is a corresponding transmission failure.

The results of the investigations are made available to the user of the network management system 35.

Figure 5:
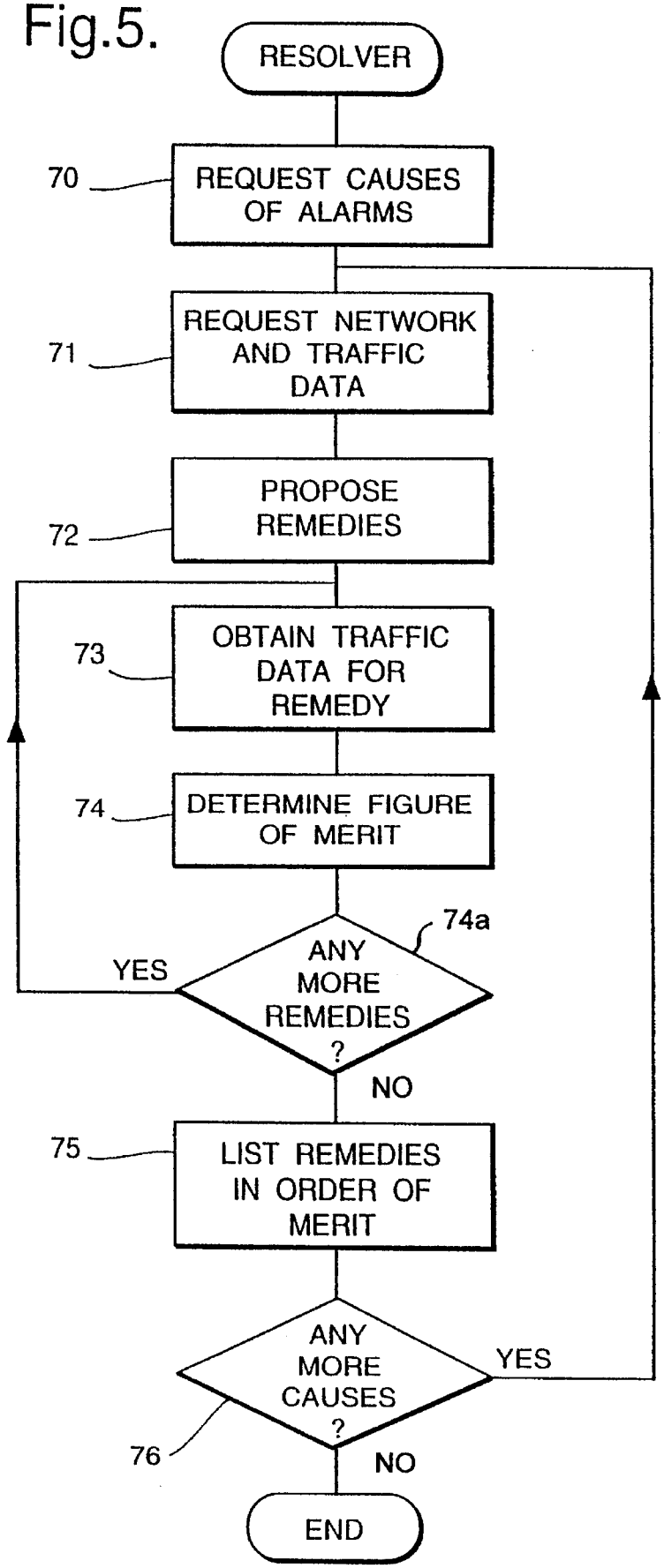

The resolver 48 obtains the causes of the alarms from the blackboard 40 and proposes remedies. The flow chart for the resolver 48 is shown in FIG. 5 and this will now be discussed.

The causes are obtained in a step 70. After obtaining the causes, traffic and network data associated with the first cause are requested in a step 71. Then, in a step 72 using remedy selection rules, the resolver reasons over the cause in relation to the local traffic and network data to propose remedies.

Then, in a step 73, for the first proposed remedy, the resolver obtains traffic data which will result from the application of the remedy. The traffic data is obtained from the blackboard 40. The, in a step 74, the resolver 48 determines a figure of merit for the proposed remedy. In determining the figure of merit, the resolver takes account of the effect of applying the proposed remedy and other factors such as priorities, costs and availability of particular routes. The resolver then repeats steps 73 and 74 (via decision block 74a) until a figure of merit is computed for each proposed remedy. Then, in a step 75, the proposed remedies are listed in order of merit. Proposed remedies are returned to the blackboard 40.

The resolver 48 then repeats steps 71 to 75 (via decision block 76) for each further cause of the alarms.

The remedy selection rules used in step 71 will depend on the exact details of the network 10 and the networks to which it is connected. The remedy selection rules may be modified in the light of experience. An exemplary set of rules is set out below.

If the cause is failure of an exchange, the remedy is to reroute all traffic so as to avoid the exchange in failure.

If the cause is transmission failure on a particular route, the remedy is to remove the route from service.

If the cause is mass calling from only one of the international exchanges 11 to 15 to a particular foreign destination exchange, and one or more appropriate additional routes are available with spare capacity, the remedy is to insert one or more of these routes into the route table of the international exchange for calls to the foreign destination exchange. If no appropriate additional route is available, the remedy is to introduce call gapping for calls from the international exchange to the foreign exchange. In call gapping a gap of, for example, five seconds is inserted after each successful call during which any further call will fail.

If the cause is mass calling from more than one of the international exchanges to a particular foreign destination exchange, the remedy is to introduce call gapping.

If the cause is traffic congestion between one the international exchanges and a particular foreign destination exchange, and one or more appropriate additional routes are available with spare capacity, the remedy is to insert one or more of these routes into the route table of the international exchange for calls to the destination exchange. If no appropriate additional route is available, the remedy is to introduce call gapping.

If the cause is a destination problem, and there is an appropriate alternative problem-free destination exchange, the remedy is to reroute calls to the problem-free destination exchange. If there is no problem-free alternative destination exchange, the remedy is to introduce call gapping.

If the cause is a route quality problem, the remedy is to remove the route from service.

If the cause is a local problem at one of the international exchanges with regard to calls to a particular foreign destination exchange, the remedy is to reroute traffic to the foreign destination exchange through another one of the international exchanges.

For each cause, an operator of the traffic management system 35 may implement one of the proposed remedies. In selecting which remedy should be implemented, the operator is guided by the arrangement of the remedies in order of merit. Alternatively, the traffic management system 35 may be programmed to implement automatically the remedy which is listed first in order of merit. The selected remedy is transmitted as a control to the network 10 by the data access manager 50.

The monitor 49 monitors the success of the implemented remedies. In order to do this, for each alarm it obtains data on traffic in the neighbourhood of the alarm at periodic intervals and monitors trends in traffic in relation to the implemented remedies. It also obtains traffic data from the simulated traffic knowledge sources 42, 43 and 44 for traffic under normal circumstances and compares this traffic data with actual traffic data in order to assess the effectiveness of the implemented remedies.

The user interface 51 comprises a display screen, keyboard and associated software. It can display the available routes between a given origin exchange and a given destination exchange. These exchanges may be located in foreign countries or within the national network associated with the international network 10. It can display both actual traffic data and also simulated traffic data for a given scenario. It also displays the alarms found by the identifier 45 and as listed by the prioritiser 46, the problems determined by the diagnoser 47 and the remedies proposed by the resolver 48. It also displays the results of the monitoring activity performed by the monitor 49.

The present invention has been described with reference to the international network 10, which connects the national network of the country in which the international network 10 is situated with telecommunications networks in other countries. However, the present invention is not limited to use with this type of network. It may also be used for managing traffic between the individual exchanges of a telecommunications network situated in a particular territory.

We claim:

1. A telecommunications system including a plurality of exchanges, a set of routes for carrying telecommunications traffic between said exchanges, and a traffic management system, said traffic management system comprising:

means for receiving traffic data from said exchanges;

means for identifying alarms from said traffic data;

means for proposing at least one suspected cause for said alarms;

means for investigating said at least one suspected cause in relation to said traffic data; and means for proposing at least one remedy for each said at least one suspected cause, a set of routes for carrying telecommunications traffic between a telecommunications network, hereinafter referred to as the first telecommunications network, and a second telecommunications network, wherein if there is an answer seizure ratio alarm on a route from an exchange in the first telecommunications network to an exchange in the second telecommunications network and also a percentage overflow alarm on a set of routes from said exchange in the first telecommunications network to said exchange in the second telecommunications network, then:

said means for proposing at least one suspected cause includes means which proposes mass calling to said exchange in the second telecommunications network as a suspected cause of said alarms, said means for investigating includes means which investigates whether mass calling has been proposed as a suspected cause from only one or more than one exchange in the first telecommunications network to said exchange in the second telecommunications network, and said means for proposing at least one remedy includes means which (a) proposes using alternative routes to the exchange in the second telecommunications network in the event that mass calling has been proposed as a suspected cause from only one exchange in the first telecommunications network, and (b) proposes call gapping to said exchange in the second telecommunications network in the event that mass calling has been proposed as a suspected cause from more than one exchange in the first telecommunications network.

2. A telecommunications network including a plurality of exchanges, a set of routes for carrying telecommunications traffic between said exchanges, said exchanges including at least one exchange for transmitting telecommunications traffic over a plurality of routes to exchanges in other telecommunications networks, and a traffic management system for managing traffic between said telecommunications network and other telecommunications networks, said traffic management system comprising:

means for receiving said traffic data from said at least one exchange for transmitting telecommunications traffic to exchanges in said other telecommunications networks, said traffic data relating to traffic between said telecommunications network and said other telecommunications networks;

means for identifying alarms from said traffic data, said identifying means comparing traffic parameter values derived from said traffic data with threshold values and identifying an alarm when one of said traffic parameter values is on the alarm side of a threshold value;

means for diagnosing at least one suspected cause for said alarms by applying predetermined cause selection rules to said alarms;

means for investigating said at least one suspected cause in relation to said traffic data by applying predetermined investigation rules to said at least one suspected cause; and means for proposing at least one remedy for said at least one suspected cause by applying remedy selection rules to said at least one suspected cause and the results of the investigation performed by said investigating means.

3. A telecommunications network as in claim 2 in which said at least one exchange for transmitting telecommunications traffic over a plurality of routes to exchanges in other telecommunications networks comprise at least two exchanges for transmitting telecommunications traffic over a plurality of routes to exchanges in said other telecommunications networks, and in which, when there is a seizure ratio alarm on a route from one of said at least two exchanges to a destination exchange in one of said other telecommunications networks and also a percentage overflow alarm on a set of routes from said one exchange to said destination exchange, said means for diagnosing at least one suspected cause includes means which proposes mass calling to said destination exchange as a suspected cause of said alarms, said investigating means includes means which investigates whether mass calling has been proposed as a suspected cause from only said one exchange or from said one exchange and another one of said at least two exchanges to said destination exchange, and said means for proposing at least one remedy includes means which (a) proposes using at least one alternative route to said destination exchange in the event that mass calling has been proposed as a suspected cause from only said one exchange, and (b) proposes call gapping to said destination exchange in the event that mass calling to said destination exchange has been proposed as the suspected cause from said one exchange and another one of said at least two exchanges to said destination exchange.

4. A method of automatically managing a telecommunications network including a plurality of exchanges, a set of routes for carrying telecommunications traffic between said exchanges, and a traffic management system, said method comprising the following steps carried out by an automated digital signal processing subsystem:

receiving traffic data from said exchanges;

identifying alarms from said traffic data;

proposing at least one suspected cause for said alarms;

investigating said at least one cause in relation to said traffic data; and proposing at least one remedy for each said at least one suspected cause, wherein a set of routes are provided for carrying telecommunications traffic between said telecommunications network, hereinafter referred to as the first telecommunications network, and a second telecommunications network, wherein if there is an answer seizure ratio alarm on a route from an exchange in the first telecommunications network, to an exchange in the second telecommunications network and also a percentage overflow alarm on a set of routes from said exchange in the first telecommunications network to said exchange in the second telecommunications network, then:

proposing mass calling to said exchange in the second telecommunications network as a suspected cause of said alarms;

investigating whether mass calling has been proposed as a suspected cause form only one or more than one exchange in the first telecommunications network to said exchange in the second telecommunications network, and proposing at least one remedy proposes using alternative routes to the exchange in the second telecommunications network in the even that mass calling has been proposed as a suspected cause from only one exchange in the first telecommunications network, and proposing call gapping to said exchange in the second network in the event that mass calling has been proposed as a suspected cause from more than one exchange in the first telecommunications network.

5. A method for automatically managing a telecommunications network including a plurality of exchanges, a set of routes for carrying telecommunications traffic between said exchanges, said exchanges including at least one exchange for transmitting telecommunications traffic over a plurality of routes to exchanges in other telecommunications networks, and a traffic management system for managing traffic between said telecommunications network and other telecommunications networks, said method comprising the following steps carried out by an automated digital signal processing subsystem:

receiving traffic data from said at least one exchange for transmitting telecommunications traffic to exchanges in said other telecommunications networks, said traffic data relating to traffic between said telecommunications network and said other telecommunications networks, identifying alarms from said traffic data, comparing traffic parameter values derived from said traffic data with threshold values and identifying an alarm when one of said traffic parameter values is on the alarm side of a threshold value;

diagnosing at least one suspected cause for said alarms by applying predetermined cause selection rules to said alarms;

investigating said at least one suspected cause in relation to said traffic data by applying predetermined investigation rules to said at least one suspected cause; and proposing at least one remedy for said at least one suspected cause by applying remedy selection rules to said at least one suspected cause and the results of said investigating step.

6. A method as in claim 5 in which said at least one exchange for transmitting telecommunications traffic over a plurality of routes to exchanges in other telecommunications networks includes at least two exchanges for transmitting telecommunications traffic over a plurality of routes to exchanges in said other telecommunications networks, and in which, when there is a seizure ratio alarm on a route from one of said at least two exchanges to a destination exchange in one of said other telecommunications networks and also a percentage overflow alarm on a set of routes from said one exchange to said destination exchange, said diagnosing step proposes mass calling to said destination exchange as a suspected cause of said alarms, said investigating step investigates whether mass calling has been proposed as a suspected cause from only said one exchange or from said one exchange and another one of said at least two exchanges to said destination exchange, and said proposing step proposes (a) using at least one alternative route to said destination exchange in the event that mass calling has been proposed as a suspected cause from only said one exchange, and (b) call gapping to said destination exchange in the event that mass calling to said destination exchange has been proposed as the suspected cause from said one exchange and another one of said at least two exchanges to said destination exchange.

* * * * *